US012748981B2

(12) United States Patent
Choi et al.

(10) Patent No.: US 12,748,981 B2
(45) Date of Patent: Sep. 29, 2026

(54) METHOD AND APPARATUS FOR TRANSFER LEARNING USING SAMPLE-BASED REGULARIZATION

(71) Applicant: SK TELECOM CO., LTD., Seoul (KR)

(72) Inventors: Yong-seok Choi, Seoul (KR); Yun Ho Jeon, Seoul (KR); Ji Won Kim, Seoul (KR); Jae Sun Park, Seoul (KR); Su Bin Yi, Seoul (KR); Dong Yeon Cho, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 842 days.

(21) Appl. No.: 17/797,702

(22) PCT Filed: Apr. 13, 2021

(86) PCT No.: PCT/KR2021/004648
§ 371 (c)(1),
(2) Date: Aug. 4, 2022

(87) PCT Pub. No.: WO2021/225294
PCT Pub. Date: Nov. 11, 2021

(65) Prior Publication Data

US 2023/0153631 A1 May 18, 2023

(30) Foreign Application Priority Data

May 7, 2020 (KR) ........................ 10-2020-0054448

(51) Int. Cl.
*G06N 3/08* (2023.01)
*G06F 18/213* (2023.01)
(Continued)

(52) U.S. Cl.
CPC ........... *G06N 3/096* (2023.01); *G06F 18/213* (2023.01); *G06F 18/22* (2023.01); *G06N 3/08* (2013.01)

(58) Field of Classification Search
None
See application file for complete search history.

(56) References Cited

U.S. PATENT DOCUMENTS 10,551,846 B1 * 2/2020 Kim ........................ G06T 7/194
2011/0231348 A1 9/2011 Xiao
(Continued)

FOREIGN PATENT DOCUMENTS

CN 111401521 A * 7/2020 ............ G06N 3/045
KR 10-2018-0034395 A 4/2018
(Continued)

OTHER PUBLICATIONS

U.S. Appl. No. 10/878,320 B2, filed Dec. 29, 2020, Qualcomm Incorporated.
(Continued)

*Primary Examiner* — Xuyang Xia
(74) *Attorney, Agent, or Firm* — Hauptman Ham, LLP

(57) ABSTRACT

In training a target model initialized by borrowing the structure and parameters of a pre-trained source model, the present disclosure provides a transfer learning apparatus and method capable of improving the performance of the target model by fine-tuning the target model using sample-based regularization that increases the similarity between features extracted from training samples belonging to the same class.

10 Claims, 4 Drawing Sheets

(51) Int. Cl.
*G06F 18/22* (2023.01)
*G06N 3/096* (2023.01)

(56) References Cited

U.S. PATENT DOCUMENTS

| | | | | |
|---|---|---|---|---|
| 2017/0024641 | A1 | 1/2017 | Wierzynski | |
| 2017/0169313 | A1 | 6/2017 | Choi et al. | |
| 2018/0285386 | A1* | 10/2018 | Liu | G06N 3/084 |
| 2018/0330205 | A1* | 11/2018 | Wu | G06N 3/02 |
| 2019/0138860 | A1* | 5/2019 | Liu | G06N 3/084 |
| 2019/0318202 | A1* | 10/2019 | Zhao | G06F 18/214 |
| 2020/0019758 | A1* | 1/2020 | Li | G06N 3/0985 |
| 2020/0043504 | A1* | 2/2020 | Li | G06N 3/08 |
| 2020/0130177 | A1* | 4/2020 | Kolouri | G06N 3/0464 |
| 2020/0160117 | A1* | 5/2020 | Urtasun | G06V 10/82 |
| 2020/0160212 | A1* | 5/2020 | Shin | G06N 3/045 |
| 2022/0051400 | A1* | 2/2022 | Izadyyazdanabadi | A61B 5/7203 |
| 2022/0343631 | A1* | 10/2022 | Namiki | G06V 10/761 |

FOREIGN PATENT DOCUMENTS

| | | | |
|---|---|---|---|
| KR | 10-2019-0138238 | A | 12/2019 |
| KR | 10-2019-0140824 | A | 12/2019 |

OTHER PUBLICATIONS

PCT International Search Report and Written Opinion, PCT/KR2020/004648, Aug. 6, 2021, 9 pages.

Li, X., Xiong, H., Wang, H., Rao, Y., Liu, L., Huan, J.: DELTA: Deep learning transfer using feature map with attention for convolutional networks. In: International Conference on Learning Representations (ICLR) (2019).

Li, X., Grandvalet, Y., Davoine, F.: Explicit inductive bias for transfer learning with convolutional networks. In: International Conference on Machine Learning (ICML) (2018).

Chen, X., Wang, S., Fu, B., Long, M., Wang, J.: Catastrophic forgetting meets negative transfer: Batch spectral shrinkage for safe transfer learning. In: Advances in Neural Information Processing Systems (NeurIPS) (2019).

* cited by examiner

Identical shapes represent the same class

METHOD AND APPARATUS FOR TRANSFER LEARNING USING SAMPLE-BASED REGULARIZATION

TECHNICAL FIELD

The present disclosure relates to an apparatus and method for transfer learning using sample-based regularization. More specifically, the present disclosure relates to a transfer learning apparatus and method capable of fine-tuning a target model using sample-based regularization that increases similarities among features inherent in training samples.

BACKGROUND

The statements in this section merely provide background information related to the present disclosure and do not necessarily constitute prior art.

Transfer learning is one research area in the realm of deep learning, which uses the knowledge obtained for a model that has completed learning a specific task to train a new model for performing a similar task. Transfer learning may be applied to any field that uses a deep learning-based deep neural network model and is one of crucial approaches for training a model to be applied to the task for which it is difficult to obtain sufficient training data.

As shown in FIG. 1, a typical transfer learning method fine-tunes a target model 100 by initializing the target model 100 for a target task similar to a source task by borrowing the structure and parameters of a source model 110 pre-trained to perform the source task and further training the target model 100 using training data specific for the target task.

Fine-tuning a pre-trained model has an advantage that since the entirety of the source model 110 is employed or only the feature extractor subsystem shown in FIG. 1 is borrowed, additional time and memory for learning may be saved. On the other hand, since training for fine-tuning often relies on a small number of training data, the generalization performance of the target model 100 achieved from transfer learning is essential. An appropriate regularization technique may be used for the fine-tuning process of transfer learning to prevent overfitting resulting from a small number of training data and improve the generalization performance. Transfer learning based on regularization techniques includes methods for performing training a target model for fine-tuning by adding, to a loss function, a regularization term that reduces the difference between parameters of the source model 110 (refer to non-patent reference 1), a regularization term that reduces the difference between the activation levels of the source model 110 and the target model 100 (refer to non-patent reference 2), and a regularization term that suppresses activation of a feature causing a singular value with small magnitude (refer to non-patent reference 3).

Given that the valuable knowledge of the source model 110 may work as well for the target model 100, the existing methods described above provide an advantage of improving the generalization performance of the target model 100 by increasing the similarity between the source model 110 and the target model 100 as much as possible. However, the existing regularization techniques have a drawback that they may limit the potential of the target model 100, and the knowledge transferred from the source model 110 may interfere with the fine-tuning process. In other words, if the gap between the source task and the target task is large, applying a regularization term based on the knowledge of the source model 110 to the fine-tuning of the target model 100 may not help improve the performance of the target model 100.

Therefore, there is a need for a transfer learning apparatus and method capable of improving the performance of a target model by performing training for fine-tuning based on the features extracted from training samples instead of using the source model as a regularization reference.

PRIOR ART REFERENCES

Non-Patent Literature

Non-patent reference 1: Li, X., Grandvalet, Y., Davoine, F.: Explicit inductive bias for transfer learning with convolutional networks. In: International Conference on Machine Learning (ICML) (2018).

Non-patent reference 2: Li, X., Xiong, H., Wang, H., Rao, Y., Liu, L., Huan, J.: DELTA: Deep learning transfer using feature map with attention for convolutional networks. In: International Conference on Learning Representations (ICLR) (2019).

Non-patent reference 3: Chen, X., Wang, S., Fu, B., Long, M., Wang, J.: Catastrophic forgetting meets negative transfer: Batch spectral shrinkage for safe transfer learning. In: Advances in Neural Information Processing Systems (NeurIPS) (2019).

DISCLOSURE

Technical Problem

In training a target model initialized by borrowing the structure and parameters of a pre-trained source model, the present disclosure intends to provide a transfer learning apparatus and method capable of improving the performance of the target model by fine-tuning the target model using sample-based regularization that increases the similarity between features extracted from training samples belonging to the same class.

SUMMARY

At least one embodiment of the present disclosure provides a transfer learning method for a target model of a transfer learning apparatus, the method comprising: extracting features from an input sample using the target model and generating an output result of classifying the input sample into a class using the features, wherein the target model comprises a feature extractor extracting the features and a classifier generating the output result; calculating a classification loss using the output result and a label corresponding to the input sample; calculating a Sample-Based Regularization (SBR) loss based on a feature pair extracted from an input sample pair belonging to the same class; and updating parameters of the target model based on the whole or part of the classification loss and the SBR loss.

Another embodiment of the present disclosure provides a transfer learning apparatus comprising a target model, the target model comprising: a feature extractor extracting features from an input sample; and a classifier generating an output result of classifying the input sample into a class using the features, wherein the target model is trained by calculating a classification loss using the output result and a label corresponding to the input sample; calculating a Sample-Based Regularization (SBR) loss based on a feature pair extracted from an input sample pair belonging to the same class; and updating parameters of at least one of the feature extractor and the classifier based on the whole or part of the classification loss and the SBR loss.

Yet another embodiment of the present disclosure provides a classification apparatus generating an output result of classifying an input sample into a class based on a target model comprising: a feature extractor extracting features from the input sample; and a classifier classifying the input sample into a class based on the features, wherein the target model is pre-trained by calculating a classification loss using an output result for an input training sample and a label corresponding to the input training sample; calculating a Sample-Based Regularization (SBR) loss based on a feature pair extracted from an input training sample pair belonging to the same class; and updating parameters of at least one of the feature extractor and the classifier based on the whole or part of the classification loss and the SBR loss.

Yet another embodiment of the present disclosure provides a computer-readable recording medium storing instructions that, when being executed by the computer, cause the computer to perform: extracting features from an input sample using a target model and generate an output result of classifying the input sample into a class using the features, wherein the target model comprises a feature extractor extracting the features and a classifier generating the output result; calculating a classification loss using the output result and a label corresponding to the input sample; calculating a Sample-Based Regularization (SBR) loss based on a feature pair extracted from an input sample pair belonging to the same class; and updating parameters of the target model based on the whole or part of the classification loss and the SBR loss.

Advantageous Effects

As described above, in training a target model using a small number of training samples, the present embodiment provides a transfer learning apparatus and method capable of fine-tuning the target model using a sample-based regularization technique that increases the similarity between features extracted from training samples belonging to the same class, thereby preventing overfitting and improving the performance of the target model.

Also, in training a target model using a small number of training samples, the present embodiment provides a transfer learning apparatus and method capable of fine-tuning the target model by efficiently calculating a sample-based regularization term that increases the similarity between features extracted from training samples belonging to the same class, thereby reducing the complexity of training the target model.

REFERENCE NUMERALS

Figure 1:
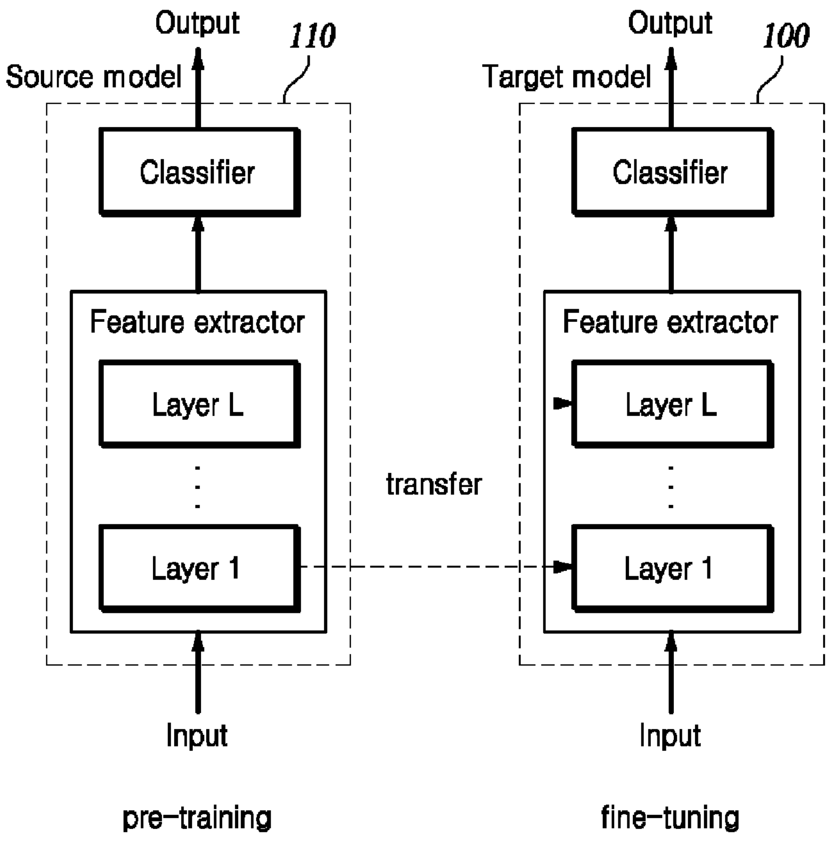
FIG. 1 illustrates the concept of a transfer learning method.

| | |
|---|---|
| 100: Target model | 110: Source model |
| 200: Transfer learning apparatus | 202: Feature extractor |
| 204: Classifier | 206: Gradient reduction layer |

DETAILED DESCRIPTION

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The detailed description to be disclosed hereinafter with the accompanying drawings is intended to describe illustrative embodiments of the present disclosure and is not intended to represent the only embodiments in which the present disclosure may be practiced.

The present disclosure relates to an apparatus and method for transfer learning using sample-based regularization. More specifically, the present disclosure provides a transfer learning apparatus and method capable of improving the performance of the target model by fine-tuning the target model using sample-based regularization that increases the similarity between features extracted from training samples belonging to the same class.

As shown in FIG. 1, transfer learning generally involves all of pre-training of a source model 110 for a source task, transfer of the structure and parameters of the source model 110 to a target model, and fine-tuning of the target model 100 for a target task; however, in what follows, a transfer learning apparatus and method having characteristics related to the implementation of fine-tuning based on a sparse set of training data will be described.

In the case of deep neural networks in which both the source model 110 and the target model 100 perform classification, each deep neural network may include a feature extractor and a classifier, as shown in FIG. 1. A linear layer that produces an output classified into the final class may be considered as a classifier, and a portion comprising a layer that obtains an input (e.g., layer 1 of FIG. 1) up to the layer that transmits output to the classifier (e.g., layer L of FIG. 1 (where L is a natural number)) may be considered as a feature extractor.

In the present embodiment, it is assumed that the transfer action is executed between deep learning-based deep neural network models having the same structure.

It is assumed that the transfer learning apparatus and method according to the present embodiment are implemented on a server (not shown in the figure) or a programmable system having a computing power comparable to that of the server.

Figure 2:
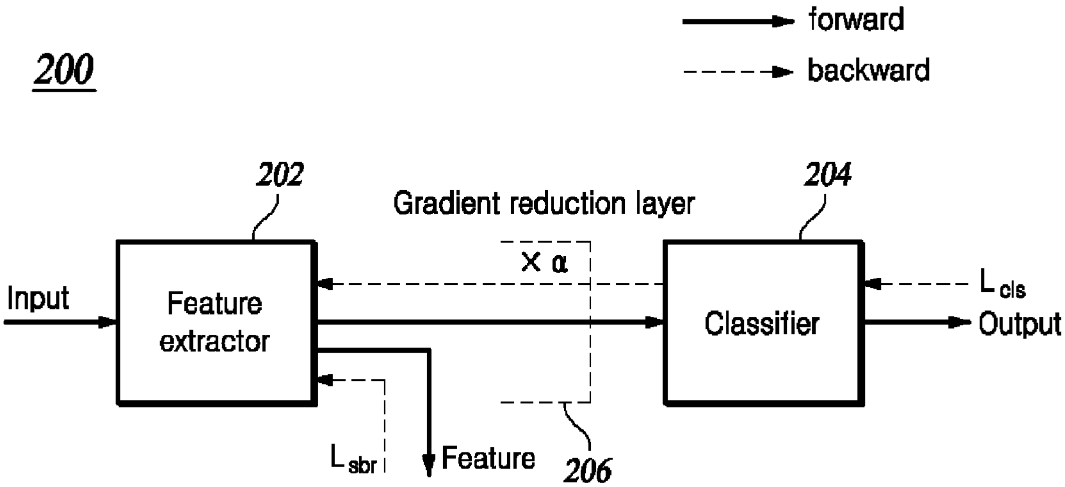
FIG. 2 illustrates a block diagram of a transfer learning apparatus according to one embodiment of the present disclosure.

FIG. 2 illustrates a block diagram of a transfer learning apparatus according to one embodiment of the present disclosure.

According to an embodiment of the present disclosure, in training a target model 100 initialized by borrowing the structure and parameters of a pre-trained source model 110, the transfer learning apparatus 200 performs fine-tuning of the target model 100 using a sample-based regularization technique that increases the similarity between the features extracted from a training sample belonging to the same class. The transfer learning apparatus 200 includes all or part of components from the feature extractor 202 and classifier 204, which constitute the target model 100, up to the gradient reduction layer 206. It should be noted that the components included in the transfer learning apparatus 200 according to the present embodiment may not be necessarily limited thereto. For example, the transfer learning apparatus 200 may further include a training unit (not shown) for training a deep neural network-based target model or may be implemented to operate in conjunction with an external training unit.

The feature extractor 202 of the target model 100 according to the present embodiment extracts features from an input training sample.

The classifier 204 of the target model 100 generates an output of classifying an input sample into a class based on the extracted features.

The gradient reduction layer 206 according to the present embodiment reduces gradient due to a classification loss at the time of backward propagation of the gradient toward the feature extractor 202. Details of the classification loss and the role of the gradient reduction layer 206 will be described later.

The diagram of FIG. 2 is an exemplary structure according to the present embodiment, and various implementations including other constituting elements or connections between constituting elements are possible depending on the input type and the structure and form of the feature extractor and the classifier.

The training data of the target model 100 for training a target task may consist of N (where N is a natural number) input samples x and the corresponding labels y, which may be expressed by the total training dataset $X=\{(x_i, y_i)\}$, i=1, . . . , N. In addition, the feature extractor 202 is represented by f, the classifier 204 is represented by g, the parameters of f and g are represented by $w_f$ and $w_g$, respectively, and the parameters of the target model 100 including f and g are represented by w.

In initializing the target model 100 by borrowing the structure and parameters of the pre-trained source model 110, the training unit of the transfer learning apparatus 200 may initialize the parameters of the feature extractor 202 using the parameters w; of the feature extractor of the source model 110 and initialize the parameters of the classifier 204 to random values.

The generalized loss function $L_T$ training the target model 100 by the training unit according to the present embodiment may be expressed by Eq. 1.

$$L_T = \sum_{i=1}^{N} L(g(f(x_i, w_f), w_g), y_i) + \lambda\Omega(w, \cdot) \quad \text{[Eq. 1]}$$

In Eq. 1, the first term represents a classification loss $L_{cls}$ for evaluating the capability of the target model 100 for inferencing a label, and the second term is obtained by multiplying the regularization term Ω (for example, when $L_2$ regularization is applied, $$\Omega(w, \cdot) = \|w\|_2^2)$$

for improving the generalization performance with a hyper-parameter λ.

The classification loss $L_{cls}$ may be calculated based on the dissimilarity between the output of the classifier 204 of the target model 100 and the label. In the case of the classifier 204, cross-entropy is mainly used to express the dissimilarity between the output and the label; however, the present disclosure is not necessarily limited to the specific metric and may use any metric capable of expressing the difference between two objects for comparison, such as a distance metric (e.g., L1 metric or L2 metric) or a similarity metric (e.g., cosine similarity, inner product, or cross-entropy).

Figure 3:
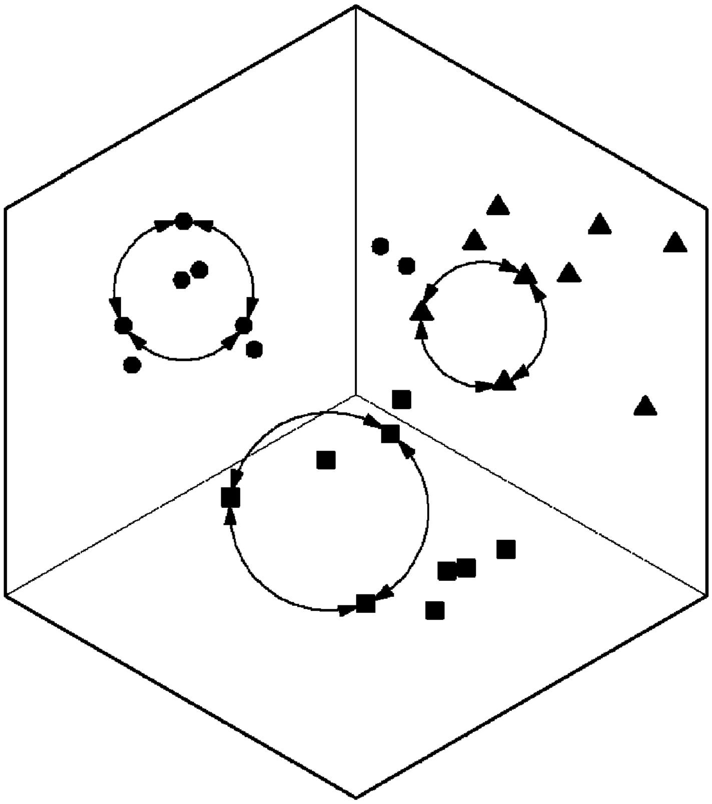
FIG. 3 illustrates the concept of sample-based regularization according to one embodiment of the present disclosure.

FIG. 3 illustrates the concept of sample-based regularization according to one embodiment of the present disclosure.

In addition to the regularization term Ω as shown in Eq. 1, to further improve the generalization performance of a target model, the training unit according to the present embodiment uses an additional regularization term. In the present embodiment, features extracted from a training sample are used as a reference for regularization instead of the source model 110. As illustrated in FIG. 3, each sample belonging to the same class may be used as a mutual reference for regularization, and in what follows, a method of calculating a regularization term based on the sample is referred to as a sample-based regularization (SBR) technique. By training the target model 100 to maximize the similarity among samples in the same class using SBR, the training unit may prevent overfitting due to using a small number of training data.

In terms of making the characteristics of each sample included in the same class similar, maximization of similarity may be considered as a generalized training method for the target model 100 performing classification based on cross-entropy. However, SBR according to the present embodiment does not directly distinguish a sample from the others of different classes but allows the classifier 204 of the target model 100 to distinguish the respective classes.

In the present embodiment, the regularization term $L_{sbr}$ based on the application of SBR may be expressed by Eq. 2.

$$L_{sbr} = \sum_{c=1}^{C} \sum_{(x_i, x_j) \in X_c} D(f(x_i, w_f), f(x_j, w_f)) \quad \text{[Eq. 2]}$$

In Eq. 2, C represents the total number of classes for classification, and $X_c$ represents a set of sample pairs ($X_c=\{(x_i,x_j)|y_i=c,y_j=c\}$) belonging to class c among training data, which is assigned one label. The function D measures the dissimilarity between outputs of the feature extractor 202 for two target objects, namely, a sample pair. SBR induces the outputs of the feature extractor 202 for two different samples belonging to the same class to have similar values. SBR considers all possible sample pairs belonging to one class and all classes included in the training data.

In another embodiment of the present disclosure, in the case of SBR in a simple form that seeks to increase the similarity for all possible sample pairs regardless of whether two samples under comparison belong to the same class, the regularization term $L_{sbr}$ may be expressed by Eq. 3.

$$L_{sbr} = \sum_{(x_i,x_j)\in X} D(f(x_i, w_f), f(x_j, w_f)) \quad \text{[Eq. 3]}$$

In Eq. 3, X represents the entire set of training data.

As shown in Eq. 2 or Eq. 3, when all possible sample pairs are considered from among training data or data belonging to the same class, a longer time may be taken for training. To alleviate the situation, when training is performed in mini-batch units for a class, a regularization term that considers the similarity within sample pairs included in one mini-batch may be defined as shown in Eq. 4.

$$L_{sbr} = \sum_{c=1}^{C} \frac{1}{N_c^{pair}} \sum_{(x_i,x_j)\in B_c} D(f(x_i, w_f), f(x_j, w_f)) \quad \text{[Eq. 4]}$$

In Eq. 4, $N_c$ represents the number of samples included in class c within one mini-batch, and $B_c$ represents a set of samples included in class c within one mini-batch.

$$N_c^{pair} = N_c(N_c - 1)$$

represents the total number of pairs comprising the samples belonging to class c within one min-batch.

Meanwhile, in Eqs. 2 to 4, dissimilarity measured by the function D may be represented by any metric capable of expressing the difference between two objects for comparison, such as a distance metric (e.g., L1 or L2 metric) or a similarity metric (e.g., cosine similarity, inner product, or cross-entropy).

In what follows, the regularization term $L_{sbr}$ is referred to as SBR loss to distinguish it from the regularization term Ω used for a loss function.

As described above, in training for classification, when a deep neural network model is trained using a cross-entropy-based loss function and a small number of training data, the distributions between the small number of training data and the data used for actual classification may be different. The classification performance of a trained model may be severely degraded because of the possibility of overfitting due to variation between the distributions.

Thus, as shown in Eq. 5, the training unit according to the present embodiment uses different loss functions $L_f$ and $L_g$ for the training of the feature extractor 202 and classifier 204 included in the target model 100 to cope with the performance degradation due to overfitting.

$$L_g = L_{cls} + \lambda_g \Omega(w, \cdot) \quad \text{[Eq. 5]}$$

$$L_f = \alpha L_{cls} + \beta L_{sbr} + \lambda_f \Omega(w, \cdot)$$

As shown in Eq. 1, $L_{cls}$ represents a classification loss that evaluates the capability of the target model 100 for inferencing a label. The loss function $L_g$ for the classifier 204 is a linear combination of $L_{cls}$ and Ω, and the loss function $L_f$ for the feature extractor 202 is a weighted combination of $L_{cls}$, $L_{sbr}$, and Ω Here, α, β, $\lambda_g$ and $\lambda_f$ are hyperparameters. The $L_{sbr}$ used in the loss function $L_f$ represents the SBR loss shown in Eq. 4; however, the present disclosure is not necessarily limited thereto, and the SBR loss shown in Eq. 2 or 3 may be used.

The training unit according to the present embodiment may fine-tune the target model 100 by updating the parameters of the feature extractor 202 and the classifier 204 using the loss function as shown in Eq. 5.

By separating the loss functions as shown in Eq. 5, the training unit may tune the hyperparameter α to reflect $L_{cls}$ with a proportion different from that for the classifier 204 to the loss function $L_f$ for the feature extractor 202 and tune the hyperparameter β to reflect the SBR loss $L_{sbr}$ with an appropriate combination with $L_{cls}$ to the loss function $L_f$. The hyperparameters α and β may be set to any value, but when a small number of training data are employed, the training unit may set α to a value smaller than 1 to reduce the dependence on a label by relatively decreasing the proportion of the $L_{cls}$. Also, the training unit may expect to reduce the effect of overfitting on the feature extractor 202 based on the effect of SBR using a relative relationship of a sample pair by setting β to an appropriate value.

Meanwhile, the training unit may update the parameters $w_f$ and $w_g$ to fine-tune the target model 100, as shown in Eq. 6.

$$w'_g = w_g - \eta_g \cdot (\nabla L_{cls} + \lambda_g \nabla \Omega(w, \cdot)) \quad \text{[Eq. 6]}$$

$$w'_f = w_f - \eta_f \cdot (\alpha \nabla L_{cls} + \beta \nabla L_{sbr} + \lambda_f \nabla \Omega(w, \cdot))$$

In Eq. 6, $\eta_g$ and $\eta_f$ are hyperparameters representing a learning rate for adjusting each training speed of the classifier 204 and the feature extractor 202. Also, ∇ is an operator representing gradient calculation for each loss term.

As shown in FIG. 2 and Eq. 6, multiplying $L_{cls}$ with α at the time of calculating the loss function $L_f$ for the feature extractor 202 is equivalent to multiplying $\nabla L_{cls}$, which is the gradient of $L_{cls}$, delivered from the classifier 204 toward the feature extractor 202 (namely, in the backward direction) at the time of training based on backward propagation, with α and delivering the multiplication result. Thus, as described above, when a is set to a value smaller than 1, the gradient is decreased, and the effect of the $L_{cls}$, when the feature extractor 202 is trained may be relatively reduced. As shown in FIG. 2, the gradient reduction layer 206 may produce the same effect as obtained by multiplying $L_{cls}$, with α by multiplying the backward gradient based on the $L_{cls}$, with α.

According to Eq. 6, the gradient may be reduced by tuning the learning rate $\eta_f$ when the feature extractor 202 is trained, but the learning rate may have a common effect on all terms of the loss function $L_f$. Therefore, gradient reduction using hyperparameter α to independently adjust the effect of $L_{cls}$ may be more efficient in training the feature extractor 202.

Meanwhile, when square of Euclidean distance is used as the SBR loss $L_{sbr}$, the training unit may use a method for improving the learning rate as shown below.

$$L_{sbr}^{L2}$$

that uses the square of Euclidean distance may be expressed by Eq. 7.

$$L_{sbr}^{L2} = \sum_{c=1}^{C} \frac{1}{N_c^{pair}} \sum_{(x_i, x_j) \in B_c} \frac{1}{2} \| f(x_i, w_f) - f(x_j, w_f) \|^2 \quad \text{[Eq. 7]}$$

Using mathematical manipulations, Eq. 7 may be converted to Eq. 8.

$$L_{sbr}^{L2} = \sum_{c=1}^{C} \frac{1}{N_c - 1} \sum_{x_i \in B_c} \| f(x_i, w_f) - C_c \|^2 \quad \text{[Eq. 8]}$$

In Eq. 8, $C_c$ represent the average of outputs of the feature extractor 202 for all of samples belonging to class c within one mini-batch, which may be expressed by Eq. 9.

$$C_c = \frac{1}{N_c} \sum_{x_i \in B_c} f(x_i, w_f) \quad \text{[Eq. 9]}$$

Instead of calculating the difference between outputs of the feature extractor 202 for $$N_c^{pair}$$

sample pairs, as shown in Eq. 8, the training unit calculates the average ($C_c$) of the outputs of the feature extractor 202 for each class and calculates the difference between the average and the output of $N_c$ samples from the feature extractor 202. It is possible to obtain the same result as expressed by Eq. 7 with α smaller number of operations using a modification shown in Eq. 8; in terms of asymptotic computational complexity, Eq. 7 has a complexity of $$O(N_c^2),$$

and Eq. 8 has a complexity of $O(N_c)$. Therefore, when training is performed in mini-batch units based on the square of Euclidean distance, the SBR loss may be more efficiently calculated as shown in Eq. 8.

According to the present embodiment described above, in training a target model using a small number of training samples, it is possible to reduce the training complexity for the target model by providing a transfer learning apparatus that fine-tunes the target model by efficiently calculating sample-based regularization terms that increase the similarity between features extracted from training samples belonging to the same class.

Figure 4:
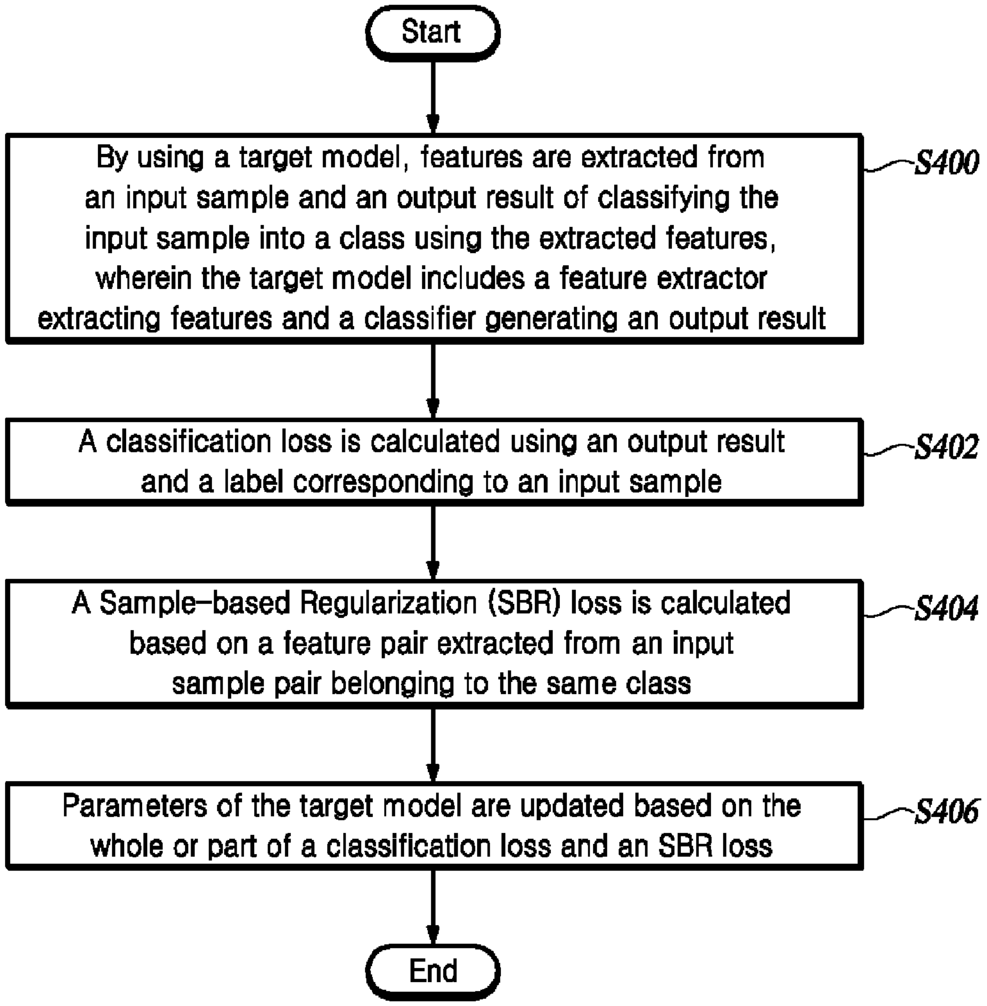
FIG. 4 illustrates a flow diagram of a transfer learning method according to one embodiment of the present disclosure.

FIG. 4 illustrates a flow diagram of a transfer learning method according to one embodiment of the present disclosure.

The training unit of the transfer learning apparatus 200 according to the present embodiment extracts features from an input sample using a target model and generates an output result of classifying the input sample into a class using the extracted features S400. Here, the target model 100 includes a feature extractor 202 extracting features and a classifier 204 generating an output result.

The target model 100 is implemented based on a deep neural network and initialized using a structure and parameters of a pre-trained, deep neural network-based source model 110. The training unit may initialize the parameters of the feature extractor 202 of the target model 100 using the parameters of the feature extractor of the source model 110 and initialize the parameters of the classifier 204 to random values.

It is assumed that a small number of training data are used for transfer learning and the training data includes an input sample.

The training unit calculates a classification loss using an output result and a label corresponding to the input sample S402.

The classification loss is a loss term for evaluating the target model's capability of inferencing a label, which may be calculated based on the dissimilarity between the output of the classifier 204 of the target model 100 and the label. In the case of the classifier 204, cross-entropy is mainly used to express the dissimilarity between an output and a label; however, the present disclosure is not necessarily limited to the specific metric and may use any metric capable of expressing the difference between two objects for comparison, such as a distance metric (e.g., L1 metric or L2 metric) or a similarity metric (e.g., cosine similarity, inner product, or cross-entropy).

The training unit calculates a Sample-based Regularization (SBR) loss based on a feature pair extracted from an input sample pair belonging to the same class S404.

To further improve the generalization performance of the target model 100, the training unit uses an SBR loss as a regularization term. Features extracted from an input training sample are used as a reference for regularization instead of the source model 110. Each sample belonging to the same class may be used as a mutual reference for regularization, and in what follows, a method of calculating a regularization term based on the sample is referred to as a sample-based regularization (SBR) technique. By training the target model 100 to maximize the similarity among outputs for the samples in the same class using SBR, the training unit may prevent overfitting due to using a small number of training data.

The training unit calculates an SBR loss based on the dissimilarity between two features constituting a feature pair extracted from an input sample pair belonging to the same class.

When all possible sample pairs are considered from among data belonging to the same class, a longer time may be taken for training. To alleviate the situation, when training is performed in mini-batch units for a class, an SBR loss may be calculated based on the dissimilarity of a feature pair extracted from a sample pair included in one mini-batch. Here, any metric, such as a distance metric (e.g., L1 metric or L2 metric) or a similarity metric (e.g., cosine similarity, inner product, or cross-entropy), capable of expressing the difference between two objects for comparison may be used to represent the dissimilarity.

The training unit updates the parameters of the target model based on the whole or part of the classification loss and the SBR loss S406.

In updating the parameters to fine-tune the target model, the training unit uses different loss functions for the training of the feature extractor 202 and classifier 204 included in the target model 100 to cope with the performance degradation due to overfitting. A loss function for the classifier 204 is generated using a classification loss, and a loss function for the feature extractor 202 is generated using a weighted combination of the classification loss and the SBR loss in terms of hyperparameters. Therefore, the training unit may update the parameters of the classifier 204 based on the classification loss and update the parameters of the feature extractor 202 based on the classification loss and the SBR loss.

By separating the loss functions, the training unit may tune the hyperparameter multiplied to the classification loss to reflect the classification loss with α proportion different from that for the classifier 204 to the loss function for the feature extractor 202. When a small number of training data are employed, the training unit may set the hyperparameter to a value smaller than 1 to reduce the dependence on a label by relatively decreasing the proportion of the classification loss.

Meanwhile, multiplying the classification loss with α hyperparameter at the time of calculating the loss function for the feature extractor 202 is equivalent to multiplying the gradient of the classification loss delivered from the classifier 204 toward the feature extractor 202 at the time of training based on backward propagation, with the hyperparameter and delivering the multiplication result. Thus, as described above, when the hyperparameter is set to a value smaller than 1, the gradient is decreased, and the effect of the classification loss when the feature extractor 202 is trained may be relatively reduced.

As described above, in training a target model using a small number of training samples, the present embodiment provides a transfer learning apparatus and method capable of fine-tuning the target model using a sample-based regularization technique that increases the similarity between features extracted from training samples belonging to the same class, thereby preventing overfitting, and improving the performance of the target model.

Although it has been described that each process is sequentially executed in each flowchart according to embodiments, the present invention is not limited thereto. In other words, the processes of the flowcharts may be changed or one or more of the processes may be performed in parallel, and the flowcharts are not limited to a time-series order.

Various implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs (which are also known as programs, software, software applications, or code) contain instructions for a programmable processor and are stored in a "computer-readable recording medium."

The computer-readable recording medium represent entities used for providing programmable processors with instructions and/or data, such as any computer program products, apparatuses, and/or devices, for example, a non-volatile or non-transitory recording medium such as a CD-ROM, ROM, memory card, hard disk, magneto-optical disk, storage device. Furthermore, the computer-readable recording medium may be distributed over computer systems connected through a network, and computer-readable program code can be stored and executed in a distributive manner.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

CROSS-REFERENCE TO RELATED APPLICATION

This application claims priority from Korean Patent Application No. 10-2020-0054448 filed on May 7, 2020, the disclosure of which is incorporated by reference herein in its entirety.

The invention claimed is:

1. A method of transfer learning from a source model to a target model of a transfer learning apparatus, the method comprising:

extracting features from input samples using the target model and generating output results of classifying the input samples into classes using the features, wherein the target model comprises a feature extractor extracting the features and a classifier generating the output results;

calculating a classification loss representing differences between the output results and labels corresponding to the input samples;

calculating a Sample-Based Regularization (SBR) loss by at least determining a distance metric between feature vectors of a pair of features extracted from a pair of the input samples belonging to same class, wherein the SBR loss regularizes similarity between features within the same class related to a target task of the target model; and repeatedly updating parameters of the target model based at least on the classification loss to reduce the differences between the output results and the labels, and the SBR loss to increase similarity of an updated pair of features extracted from the pair of the input samples belonging to the same class until the classification loss or the SBR loss converges to a predetermined threshold.

2. The method of claim 1, further including:

reducing gradient due to the classification loss by multiplying a hyper-parameter using a gradient reduction layer during backward propagation of the gradient toward the feature extractor.

3. The method of claim 1, wherein the target model is implemented based on a deep neural network and initialized using a structure and parameters of the source model that is pre-trained and deep neural network based, wherein parameters of the feature extractor are initialized based on the parameters of the source model, and parameters of the classifier are initialized to random values.

4. The method of claim 1, wherein the repeatedly updating the parameters repeatedly updates parameters of the classifier based on the classification loss and repeatedly updates parameters of the feature extractor based on the classification loss and the SBR loss.

5. The method of claim 1, wherein the distance metric is Euclidean distance between an output result of the feature extractor for an input sample included in a mini-batch for the same class and an average of output results of the feature extractor for input samples included in the mini-batch.

6. A transfer learning apparatus comprising a target model that is generated by transfer learning from a source model, wherein the target model comprises:

a feature extractor configured to extract features from input samples; and a classifier configured to generate output results of classifying the input samples into classes using the features, wherein the target model is trained by:

calculating a classification loss representing differences between the output results and labels corresponding to the input samples;

calculating a Sample-Based Regularization (SBR) loss by at least determining a distance metric between feature vectors of a pair of features extracted from a pair of the input samples belonging to same class, wherein the SBR loss regularizes similarity between features within the same class related to a target task of the target model; and repeatedly updating parameters of the target model based at least on the classification loss to reduce the differences between the output results and the labels, and the SBR loss to increase similarity of an updated pair of features extracted from the pair of the input samples belonging to the same class until the classification loss or the SBR loss converges to a predetermined threshold.

7. The apparatus of claim 6, wherein the target model further includes a gradient reduction layer reducing gradient due to the classification loss by multiplying a hyper-parameter during backward propagation of the gradient toward the feature extractor.

8. The apparatus of claim 6, wherein the target model is implemented based on a deep neural network and initialized using a structure and parameters of the source model that is pre-trained and deep-neural network based, wherein parameters of the feature extractor are initialized based on the parameters of the source model, and parameters of the classifier are initialized to random values.

9. A classification apparatus generating output results of classifying input samples into classes based on a target model, the classification apparatus comprising:

a feature extractor extracting features from the input samples; and a classifier classifying the input samples into the classes based on the features, wherein the target model is pre-trained by calculating a classification loss representing differences between the output results and labels corresponding to the input samples;

calculating a Sample-Based Regularization (SBR) loss by at least determining a distance metric between feature vectors of a pair of features extracted from a pair of the input samples belonging to same class, wherein the SBR loss regularizes similarity between features within the same class related to a target task of the target model; and repeatedly updating parameters of the target model based at least on the classification loss to reduce the differences between the output results and the labels, and the SBR loss to increase similarity of an updated pair of features extracted from the pair of the input samples belonging to the same class until the classification loss or the SBR loss converges to a predetermined threshold.

10. A computer-readable recording medium storing instructions that, when being executed by a computer, cause the computer to perform:

extracting features from input samples using a target model and generating output results of classifying the input samples into classes using the features, wherein the target model comprises a feature extractor extracting the features and a classifier generating the output results;

calculating a classification loss representing differences between the output results and labels corresponding to the input samples;

calculating a Sample-Based Regularization (SBR) loss by at least determining a distance metric between feature vectors of a pair of features extracted from a pair of the input samples belonging to same class, wherein the SBR loss regularizes similarity between features within the same class related to a target task of the target model; and repeatedly updating parameters of the target model based at least on the classification loss to reduce the differences between the output results and the labels, and the SBR loss to increase similarity of an updated pair of features extracted from the pair of the input samples belonging to the same class until the classification loss or the SBR loss converges to a predetermined threshold.

* * * * *